Jan. 26, 1943. A. D. ALBERT 2,309,430
PNEUMATIC VALVE
Filed Jan. 16, 1940

INVENTOR
Alan D. Albert
BY Kenyon & Kenyon
ATTORNEYS

Patented Jan. 26, 1943

2,309,430

UNITED STATES PATENT OFFICE 2,309,430

PNEUMATIC VALVE

Alan D. Albert, Fairfield, Conn., assignor to Bridgeport Brass Company, Bridgeport, Conn., a corporation of Connecticut Application January 16, 1940, Serial No. 314,045

7 Claims. (Cl. 277—42)

This invention relates to pneumatic valves and more especially to tire valves of the so-called rubber stem type.

An object of this invention is an improved valve structure which is simple and strong in construction, requires no cap, has only one seal, is economical to manufacture, easy to assemble and requires no threads.

Other objects, novel features and advantages of this invention will become apparent from the following specification and accompanying drawing, wherein.

Figure 1:
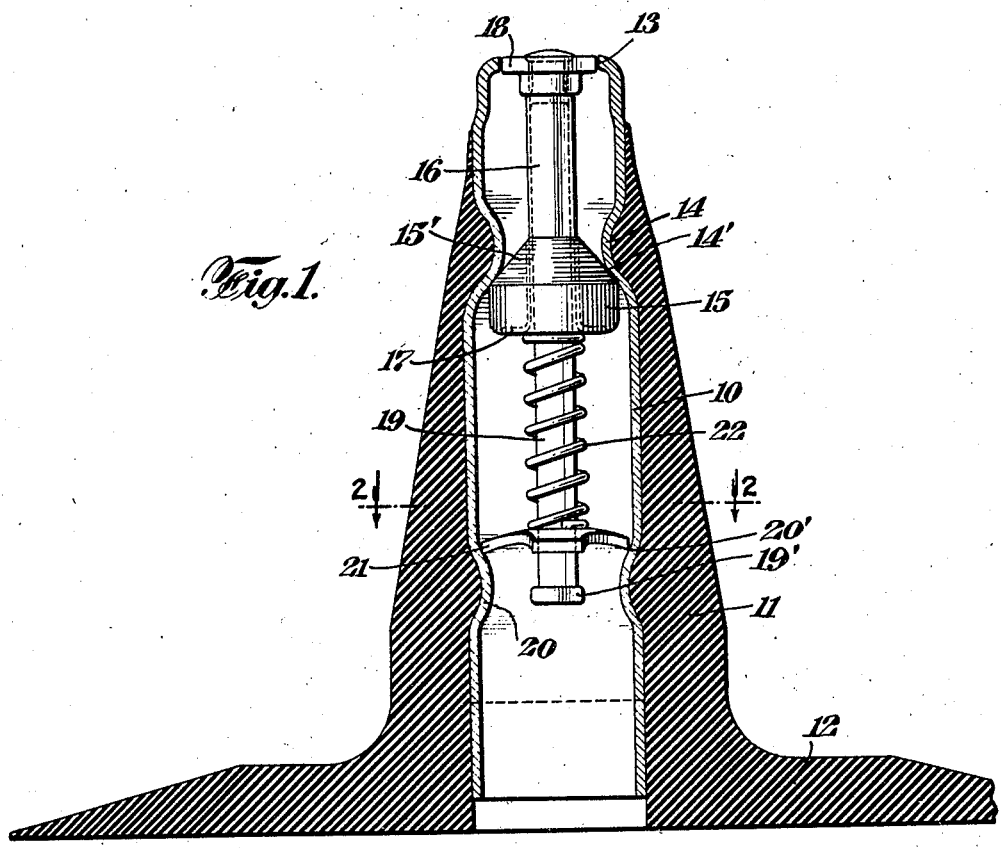
Fig. 1 is a longitudinal section through a valve embodying the invention.
Figure 2:
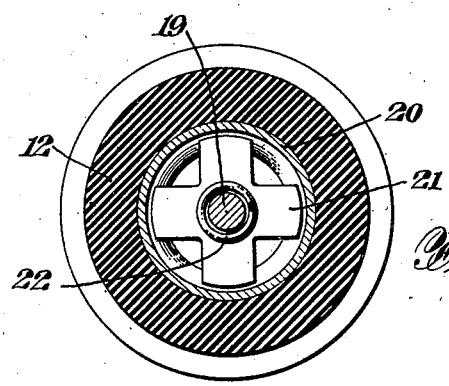
Fig. 2 is a section substantially on the line 2—2 of Fig. 1.

A tubular or barrel member 10 is supported by a stem 11 of yieldable material, such, for example, as rubber or rubber composition provided with an integral flap or patch 12 adapted for vulcanization to the exterior surface of a tire tube (not shown). The barrel member 10 preferably is composed of sheet metal drawn into the shape shown from a metal disk according to well-known manufacturing practice and, after being drawn into proper shape, a portion of the metal is cut away to form the opening 13 at its upper or outer end, which opening is of less diameter than the major portion of the barrel member. Thus, the member 10 is of less interior diameter at its end than it is adjacent said end. Also, during the forming of the barrel member, an annular section is rolled inwardly at 14 to provide a valve seat 14' on the interior surface of the barrel.

A valve body 15 is positioned within the barrel 10 and is formed or provided with a conical portion 15' adapted to engage the valve seat 14' for the purpose of forming an air tight seal. This valve body 15 is preferably composed of rubber or other suitable material and is vulcanized or otherwise connected to the lower end of tube 16, which is formed with the laterally and outwardly directed terminal flange 17, the diameter of which is at least equal to the interior diameter of the annular section 14 of the barrel member 10. The outer or upper end of tube 16 is closed and a button or disc member 18 of proper diameter is attached or connected to this closed end of tube 16 and is adapted to fit within and substantially close the opening 13. The length of the tube 16 and the position of the button 18 on the tube is such that the button 18 closes the opening 13 when the valve body 15 is seated upon and engages the valve seat 14'.

A center pin 19 is provided, which projects for about one-half its length into the tube 16 within which it is suitably fixed. The remainder of the pin 19 projects downwardly from the valve body 15 toward the lower end of the barrel 10. A second annular section 20 is rolled in the lower portion of the barrel 10 and forms an internal shoulder or abutment 20'. A dished spider or holding member 21 is positioned within the barrel 10 and engages the shoulder or abutment 20'. The lower end portion of pin 19 passes through an opening in the spider 21 and is freely movable relative to it, having a head 19' on its extreme lower end. A helical spring 22 surrounds the lower part of the pin 19 and its upper end bears against the flange 17 and its lower end bears against the upper face of the spider 21. This spring 22 is therefore effective to maintain the valve body 15 in sealing or seating engagement with the valve seat 14'. In such position, button 18 closes opening 13.

In constructing the valve above described, the flanged tube 16 is first attached to the valve body 15 and is provided with the button 18. Following this, the pin 19, together with the spring 22 and spider 21 are assembled with the sub-assembly just described and the entire assembly is introduced into the barrel member 10 through its lower end until the valve body 15 engages the seat 14'. The spider 21 is then forced upwardly until it comes into engagement with the upper face of shoulder 20' formed by the annular section 20. Such shoulder 20' serves as a stop to prevent withdrawal of the spider 21 and the elements in assembly therewith.

Engagement of the valve body 15 with the seat 14' prevents the escape of air from the tube to which the stem is attached. The button 18 serves to prevent dirt and other material from entering the barrel 10 through the opening 13. During inflation of the tire, the button 18 is forced into the barrel member 10 and by reason of the enlarged diameter of the barrel member adjacent the opening 13 sufficient clearance is provided for the free passage of air around the periphery of the button 18.

The spider 21 is suitably dished upwardly or in the direction of the valve body and of such diameter that it will yield sufficiently upon being pushed into the barrel 10 to allow its being forced beyond annular section 20 and into effective engagement with shoulder 20'. However, because of the dished condition of the spider 21, it cannot be withdrawn from the barrel by downward movement of the spider, such as might be caused by the spring 22. In such event it will tend to spread and so be restrained from farther downward movement by the shoulder 20' below it. It will be evident that the annular section 20 can be formed of reduced diameter, as shown or it can be rolled so that it is of somewhat larger diameter than the barrel, but still forming an annular outwardly extending support or shoulder for the spider. In either case, the spider will, upon proper insertion in the barrel, become engaged with the shoulder or bulge 20' formed by the modified diameter of the annular section 20.

In view of the simple and strong construction, this valve will have a long life, usually as long as that of the tube to which it is assembled. If, however, it is necessary to replace the inside construction, the entire inside assembly may be forced out of the valve barrel by an appropriate tool inserted from the top thereof, and a new inside assembly may be inserted from the bottom. This operation can readily be performed by cutting an opening through the tube opposite the valve stem and then, after the old inside construction is removed and the new one placed in position, this opening can be patched, vulcanized or otherwise suitably closed.

I claim:

1. In a device of the character described for use in a valve stem of rubber or the like, a barrel member having a first annular section of reduced interior diameter at a point removed from the end of said barrel and forming a valve seat, and a second annular section of different diameter from the major portion of the barrel also located at a point removed from the ends of the barrel, said two annular sections also forming annular grooves in the outer surface face of said barrel into both of which the material of said stem extends to prevent longitudinal displacement of said barrel member with respect to said stem, a valve body arranged between said annular sections and adapted to seat against the seat of said first section, a tubular closure member attached to and extending through said valve body toward said barrel member end, a pin fitted into said tube and extending from said valve body toward said second annular section, a spider slidable on said pin and engaging said second section, and a spring interposed between said valve body and spider.

2. In a valve for a pneumatic tire, a barrel member, an annular constricted section in said barrel adapted to provide a valve seat, a second annular section of modified diameter in the barrel, a valve body arranged between the said annular sections and adapted to seat against said constricted section, a tubular member attached to and extending through said valve body toward said barrel member end, a pin fitted into said tubular member and extending from said valve body toward said second annular section, a spider slidable on said pin and engaging said second section, a spring interposed between said valve body and spider, said spider being dished toward said valve body whereby it may be pushed inwardly into effective engagement with said second annular section, but cannot be pulled outwardly.

3. In a device of the character described, a barrel member having a first annular section of reduced interior diameter and a second annular section of different diameter from the major portion of the barrel both said sections being rolled into and located at points other than the ends of said barrel, a valve body arranged to extend into the portion of said barrel member between said annular sections and adapted to seat against said first section, a tubular member attached to and extending through said valve body toward said barrel member end, a pin fitted into said tubular member and extending from said valve body toward the second annular section, a spider slidable on said pin and engaging said second annular section, and a spring interposed between said valve body and said spider, said spider being dished toward said valve body whereby it may be pushed inwardly into effective engagement with said second annular section but cannot be pulled outwardly.

4. In a device of the character described for use in a valve stem of rubber or the like, a barrel member having a first annular section of reduced interior diameter and a second annular section of different diameter from the major portion of the barrel, both said annular sections being located at points removed from the ends of said barrel, said barrel being of larger interior diameter adjacent one end than at that end, said two annular sections also forming annular grooves in the outer surface of said barrel into both of which the material of said stem may extend to prevent longitudinal displacement of said barrel member with respect to said stem, a valve body arranged between said annular sections and adapted to seat against said first section, a tube attached to and extending through said valve body toward said barrel member end, a head on said tube adapted to close the end of said barrel member, a pin fitted into said tube and extending from said valve body toward said second annular section, a spider slidable on said pin and engaging said second annular section, and a spring interposed between said valve body and said spider.

5. In a device of the character described for use in a valve stem of rubber or the like, a barrel member having a first and a second annular section formed by varying the diameter of the barrel member both said sections lying at points other than the ends of said barrel member, of which at least the first section is of reduced diameter relative to the major portion of the barrel, said barrel being of larger interior diameter adjacent one end than at that end, said two annular sections also forming annular grooves in the outer surface of said barrel into both of which the material of said stem may extend to prevent longitudinal displacement of said barrel member with respect to said stem, a valve body arranged to extend into the portion of said barrel between said annular sections and adapted to seat against said first section, a tube attached to and extending through said valve body toward said barrel member end, a pin fitted into said tubular member and extending from said valve body toward said second annular section, a button at one end of said pin adapted to close said end of said barrel member, a spider slidable on said pin and engaging said second annular section, means to prevent removal of said spider from said pin, and a spring interposed between said valve body and said spider.

6. In a tire valve, a barrel member having a first and a second annular section of reduced interior diameter and being of larger interior diameter adjacent one end than at that end, a valve body arranged between said annular sections and adapted to seat against said first section, a tube attached to and extending through said valve body toward said barrel member end, a head on said tube adapted to close the end of said barrel member, a pin fitted into said tube and extending from said valve body toward said second annular section, a spider slidable on said pin and engaging said second annular section, and a spring interposed between said valve body and said spider, said spider being dished toward said valve body whereby it may be pushed inwardly past said second annular section but cannot be pulled outwardly.

7. In a device of the character described, a barrel member having a first and a second annular section of reduced interior diameter and being of larger interior diameter adjacent one end than at said end, said sections being formed in and located at points other than the ends of said barrel member, a valve body arranged to extend into portions of said barrel between said annular sections and adapted to seat against said first section, a tubular member attached to and extending through said valve body toward said barrel member end, a pin fitted into said tubular member and extending from said valve body toward said second annular section, a button at one end of said pin adapted to close said one end of said barrel member, a spider slidable on said pin and engaging said second annular section, and a spring interposed between said valve body and said spider, and a head at the opposite end of said pin to prevent removal of said spider therefrom, said spider being dished toward said valve body whereby it may be pushed inwardly past said second annular section but cannot be pulled outwardly.

ALAN D. ALBERT.